US012198534B2

(12) United States Patent
Moore

(10) Patent No.: US 12,198,534 B2
(45) **Date of Patent: *Jan. 14, 2025**

(54) SYSTEM FOR PROVIDING LOCATION ALERTS RELATING TO EMERGENCIES

(71) Applicant: Bobby Joe Moore, Union City, TN (US)

(72) Inventor: Bobby Joe Moore, Union City, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,504

(22) Filed: Apr. 26, 2023

(65) Prior Publication Data

US 2023/0334963 A1 Oct. 19, 2023

Related U.S. Application Data

(63) Continuation of application No. 17/234,875, filed on Apr. 20, 2021, now Pat. No. 11,670,142, which is a (Continued)

(51) Int. Cl.
*G08B 5/00* (2006.01)
*G08B 3/00* (2006.01)

(52) U.S. Cl.
CPC ............... *G08B 5/002* (2013.01); *G08B 3/00* (2013.01)

(58) Field of Classification Search
None
See application file for complete search history.

(56) References Cited

U.S. PATENT DOCUMENTS 4,929,936 A 5/1990 Friedman et al.
4,931,780 A 6/1990 Lamont et al.
(Continued)

FOREIGN PATENT DOCUMENTS

AU 2008243707 A1 11/2008
CN 103347178 A 10/2013
(Continued)

OTHER PUBLICATIONS

911switch.com, In An Emergency Be Seen. Save Time. Save A Life. Use The 911Switch, Mar. 15, 2018, 7 pages.
(Continued)

*Primary Examiner* — Fekadeselassie Girma
(74) *Attorney, Agent, or Firm* — Moore & Van Allen PLLC; W. Kevin Ransom

(57) ABSTRACT

Disclosed is a system for generating alerts communicated to emergency responders and/or contacts indicating a location of an incident. The system comprises a housing, one or more light sources, and a computing processor. A switch is located in the housing and configured to be accessible to a user. When the switch is actuated by a user indicating an incident, the processor provides power to the at least one light source to output light from the housing thereby indicating the location of the system. The system may also control a speaker to output an audible signal and a transmitter to transmit an emergency signal with location information to a device of an emergency responder and/or an emergency contact. The present invention may also be embodied in a software application that is implemented on a mobile device to thereby leverage the components of the mobile device to send alerts.

16 Claims, 9 Drawing Sheets

Related U.S. Application Data continuation of application No. 16/844,461, filed on Apr. 9, 2020, now Pat. No. 11,017,642.

(60) Provisional application No. 62/833,344, filed on Apr. 12, 2019.

(56) References Cited

U.S. PATENT DOCUMENTS

| | | | | |
|---|---|---|---|---|
| 4,998,095 | A | 3/1991 | Shields | |
| 5,926,112 | A | 7/1999 | Hartzell | |
| 6,262,653 | B1 | 7/2001 | Pietriferno | |
| 6,518,878 | B1 | 2/2003 | Skoff | |
| 9,679,711 | B1 * | 6/2017 | Rintz | H05B 47/105 |
| 10,147,319 | B1 * | 12/2018 | Chen | B60K 28/06 |
| 10,586,623 | B2 * | 3/2020 | Avitan | G16H 80/00 |
| 10,892,059 | B2 * | 1/2021 | Avitan | A61B 5/0205 |
| 11,017,642 | B2 * | 5/2021 | Moore | G08B 7/06 |
| 2004/0036627 | A1 | 2/2004 | Knoski et al. | |
| 2005/0134455 | A1 | 6/2005 | Binning | |
| 2006/0281435 | A1 | 12/2006 | Shearer et al. | |
| 2007/0241922 | A1 | 10/2007 | Brannon | |
| 2008/0211656 | A1 | 9/2008 | Binning | |
| 2009/0215428 | A1 * | 8/2009 | Noldus | H04W 4/90 455/445 |
| 2010/0265089 | A1 | 10/2010 | Gregory | |
| 2013/0260825 | A1 | 10/2013 | Hagenstad | |
| 2014/0167954 | A1 | 6/2014 | Johnson et al. | |
| 2016/0029195 | A1 * | 1/2016 | Leahy | H04M 1/7243 455/404.2 |
| 2016/0321921 | A1 | 11/2016 | Stafford et al. | |
| 2017/0172462 | A1 * | 6/2017 | Alghazi | A45B 3/00 |
| 2018/0375991 | A1 * | 12/2018 | Bot | H04W 76/12 |
| 2019/0043501 | A1 * | 2/2019 | Ramaci | G16H 40/20 |
| 2019/0043622 | A1 * | 2/2019 | Ramaci | G06F 1/163 |
| 2019/0066822 | A1 * | 2/2019 | Ramaci | G16H 80/00 |
| 2019/0096216 | A1 * | 3/2019 | Eaton | G01S 19/17 |
| 2019/0172571 | A1 * | 6/2019 | Ramaci | G16H 20/30 |
| 2019/0214153 | A1 * | 7/2019 | Avitan | H04Q 9/00 |
| 2019/0228850 | A1 * | 7/2019 | Ramaci | G07F 9/002 |
| 2019/0261153 | A1 * | 8/2019 | Avitan | G16H 40/67 |
| 2020/0296565 | A1 * | 9/2020 | Glidewell | H04W 4/33 |

FOREIGN PATENT DOCUMENTS

| | | | |
|---|---|---|---|
| CN | 106530629 | A | 3/2017 |
| JP | 4614556 | B2 | 1/2011 |
| JP | 2013033428 | A | 2/2013 |
| KR | 101895215 | B1 | 9/2018 |
| WO | 2005027077 | A2 | 3/2005 |

OTHER PUBLICATIONS

GE, 911 Emergency Light Switch 50269, Sep. 11, 2017, 3 pages.
LifeLite, Introducing LifeLite, Oct. 15, 2016, 36 pages, http://lifelite.org/.
Phantom911, Active Shooter Emergency LED Lights, Jan. 1, 2016, 3 pages, https://phantomlights.com/.
Safety Now Solutions LLC, 911 Help SMS App, Mar. 21, 2015, 3 pages.

* cited by examiner

SYSTEM FOR PROVIDING LOCATION ALERTS RELATING TO EMERGENCIES

CROSS-REFERENCE TO RELATED APPLICATION(S)

This application is a continuation application of U.S. patent application Ser. No. 17/234,875 filed Apr. 20, 2021, which, in turn, is a continuation application of U.S. patent application Ser. No. 16/844,461 filed Apr. 9, 2020, now U.S. Pat. No. 11,017,642, which, in turn, is a non-provisional application of U.S. Provisional Patent Application No. 62/833,344, filed Apr. 12, 2019, the contents of each of which are hereby incorporated by reference herein.

FIELD OF THE INVENTION

The present invention relates generally to the field of emergency location notifications.

BACKGROUND OF THE INVENTION

When faced with an emergency, it is commonplace to contact emergency services by, for example, dialing 911. To be able to determine where to send help, a dispatcher and responding emergency services must possess or acquire accurate geographical location of the person in need at the moment of need. Often times, in an emergency, the caller is unable to communicate accurate geographical information and the responding emergency services may be unable to locate the address in which the emergency is taking place.

Many times, emergency response units lose crucial time trying to locate and reach the scene of an accident. In addition to slow response times from emergency response units, it is also commonplace that the injured individual(s) may not be cognizant or physically able to track down loved ones or other contacts to notify them of the situation.

Location of an emergency may be more difficult to pinpoint in either higher densely (e.g., apartment buildings) or lesser densely (rural areas) populated locations. For example in an apartment building setting, it may be difficult from the parking lot to determine which apartment is the location of the emergency. In rural areas, where houses are located on large properties, pinpointing the emergency location may also be difficult. A similar issue may be where the emergency is in a field or forest.

Various attempts have been made to solve the problems which may be found in the related art but have thus far been unsuccessful. A need exists for a reliable system to avoid the above-mentioned problems.

BRIEF SUMMARY OF THE INVENTION

In view of the foregoing disadvantages inherent in the known art, the present invention provides a system. The general purpose of the present invention provides an emergency distress system and mobile application for signaling and notifying emergency contacts to the precise location and nature of the incident. The system may be physically placed on a vehicle, in or near to a residential home, office building, etc. or near any accident scene to better alert first response teams to the scene of the incident. The included mobile application may be useful for alerting other individuals from a user's contact list, thereby notifying them of the location and nature of the emergency.

The features of the invention which are believed to be novel are particularly pointed out and distinctly claimed in the concluding portion of the specification. These and other features, aspects, and advantages of the present invention will become better understood with reference to the following drawings and detailed description.

As an example, in one embodiment, the present invention provides a system for generating alerts communicated to emergency responders indicating a location of an incident. The system comprises a housing, one or more light sources connected to the housing, and a computing processor located in the housing. A switch is located in the housing and configured to be accessible to a user. In this embodiment, when the switch is actuated by a user indicating an incident, the processor provides power to the at least one light source to output light from the housing thereby indicating the location of the system.

In one embodiment, the system further comprises a power source connected to at least the computing processor. It some embodiments, the power source is rechargeable and the system may further comprise a solar cell located in the housing and connected to the power source to thereby recharge the power source.

In one embodiment, the system further comprises a speaker in the housing electrically connected to the computing processor. The computing processor is configured to control the speaker to output an audible sound when the switch is activated by the user.

In one embodiment, the system further comprises a transmitter electrically connected to the computing processor, and the computing processor is configured to control the transmitter to transmit an emergency signal, when the switch is activated by the user.

In one embodiment, the system further comprises a plurality of switches, where each switch corresponds to a type of emergency, wherein the computing processor is configured to control the transmitter to transmit an emergency signal that is specific to a particular switch of the plurality of switches that is activated by the user.

In one embodiment, the system further comprises a global positioning system connected to the computing processor, wherein the computing processor is capable of receiving location data from the global positioning system and controlling the transmitter to transmit the location data.

In one embodiment, the system further comprises a data storage device connected to the computing processor, the data storage device comprising location data, wherein the computing processor is capable of receiving location data from the data storage device and controlling the transmitter to transmit the location data.

In some examples, the transmitter is Wi-Fi compatible or Bluetooth compatible or otherwise wirelessly compatible to transmit the emergency wirelessly. In some embodiments, the transmitter could be configured for wired connection, such as via a wire or an ethernet connection.

In one embodiment, the system further comprises a cellular subscriber identity module (SIM) connected to the computing processor, wherein the computing processor is configured to use the SIM module and the transmitter to transmit an emergency signal via the cellular network.

In one embodiment, the system further comprises a data storage device connected to the computing processor, the data storage device comprising computer instruction code representing different light patterns for operation of the one or more light sources, and wherein the computing processor is capable of operation of the instruction code to activate the one or more light sources in different light patterns to indicate an emergency.

In one embodiment, the system further comprises a receiver for receiving signals from a remote device. In one embodiment, the is one of at least a Bluetooth receiver and/or a Wi-Fi receiver for communicating with other devices, such as a user's mobile phone or a laptop, electronic pad, or computer.

In one embodiment, the system further comprises a data storage device connected to the computing processor and a cellular subscriber identity module (SIM), wherein the data storage device comprises location data and cellular information for one or more users, wherein the computing processor is capable of receiving location data from the data storage device and controlling the transmitter to transmit the location data using the SIM module to the one or more contacts stored in the data storage device. The contacts could include emergency responders as well as family, friends or other contacts.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

The figures which accompany the written portion of this specification illustrate embodiments and method(s) of use for the present invention, constructed and operative according to the teachings of the present invention.

The various embodiments of the present invention will hereinafter be described in conjunction with the appended drawings.

DETAILED DESCRIPTION OF THE INVENTION

As discussed above, embodiments of the present invention relate to an emergency notification device for use to pinpoint the location of an emergency.

Figure 1:
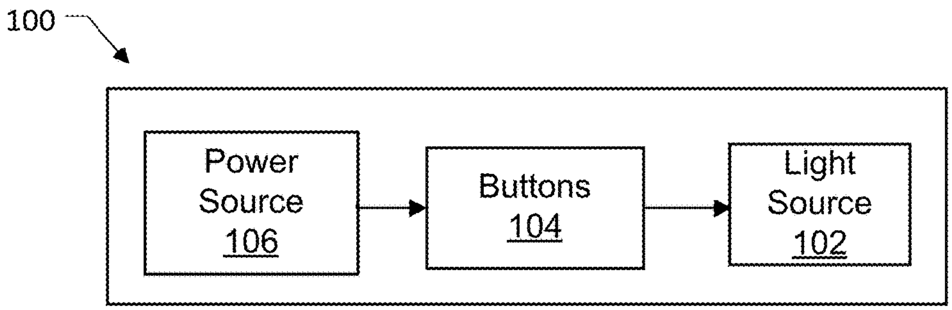
FIG. 1 illustrates a system diagram according to one or more embodiments of the present invention.

FIG. 1 illustrates an operational diagram of one embodiment of the present invention. In this embodiment, the system 100 includes a housing 101, at least one light source 102, at least one button or switch 104, and a power source 106. The button or switch 104 is located electrically between the power source 106 and the light source 102. In this embodiment, when the user activates the button or switch 104, the light source 102 is supplied with power and illuminates to indicate an emergency.

Figure 2:
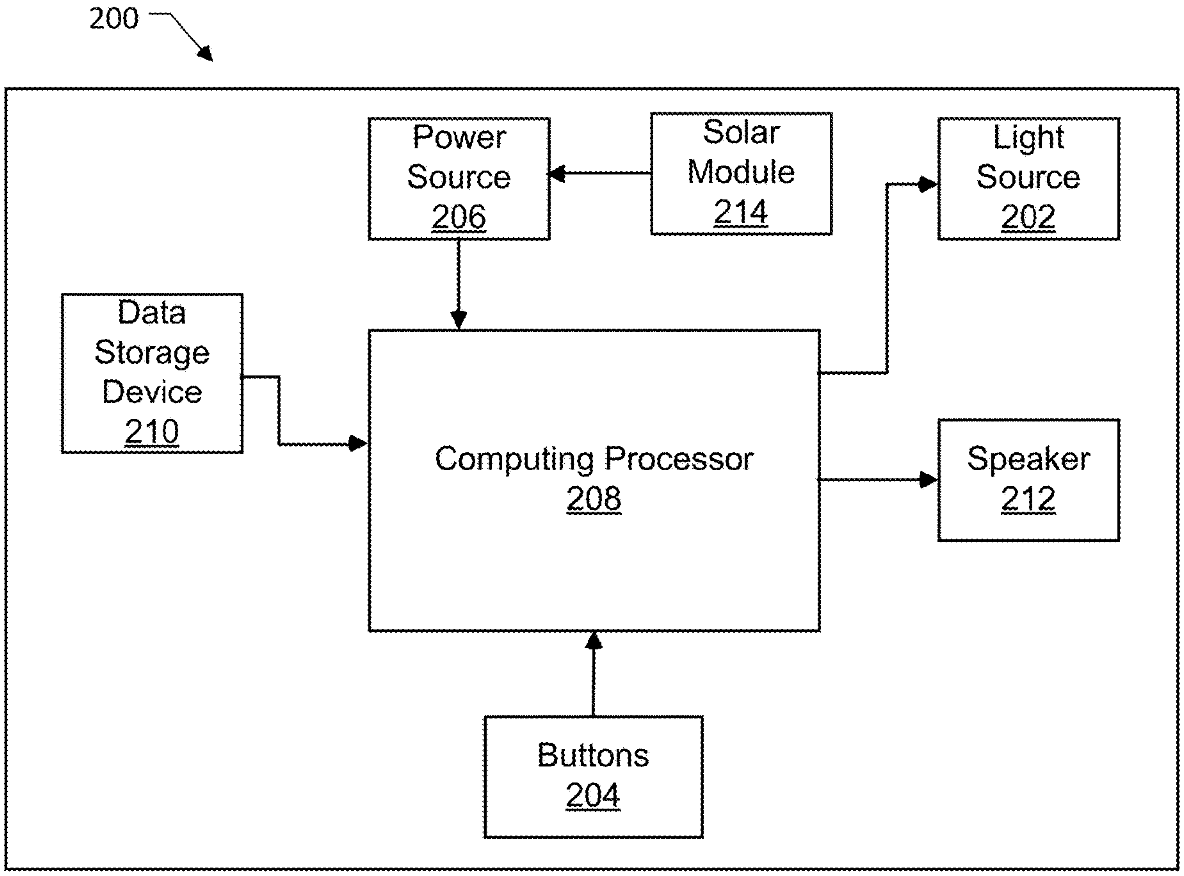
FIG. 2 illustrates a system diagram according to another embodiment of the present invention.

FIG. 2 illustrates an operational diagram of a further embodiment. In this embodiment, the system 200 further includes a computing processor 208, such as an application-specific integrated circuit (ASIC) or a microprocessor configured in operate computer instruction code, connected to the power source 206. The system 200 may also include a data storage device 210. In this embodiment, when the user activates the button or switch 204, the microprocessor 208 then controls operation of the light source 202 based either on a transistor network (in the instance where the computing processor is an ASIC) or based on computer code stored in the data storage device 210 (in the instance where the computing processor is a microprocessor). In this embodiment, the computing processor 208 may control the light source 202 using various patterns to create different light patterns and colors, such as flashing lights, lights with different colors, strobes, and the like. In one further optional embodiment, the system 200 may include a speaker 212, whereby the computing processor 208 may control to play a sound or series of sounds as an audible alarm.

In one further alternative embodiment, the power source 206 may be a rechargeable power source, such as a battery. In this embodiment, the system 200 may further include a solar panel 214 configured to recharge the power source 206, as needed.

It is understood that the systems described herein may include one or a series of buttons or switches. Each button or switch may be associated with a different type of emergency, such as fire, burglary, accident, and the like, such that by selecting the appropriate button, a particular type of emergency responder may be contacted. Further, depending on the button(s) selected, different light patterns and audible sounds may be output by the lights source and speaker to identify the particular emergency.

Figure 3:
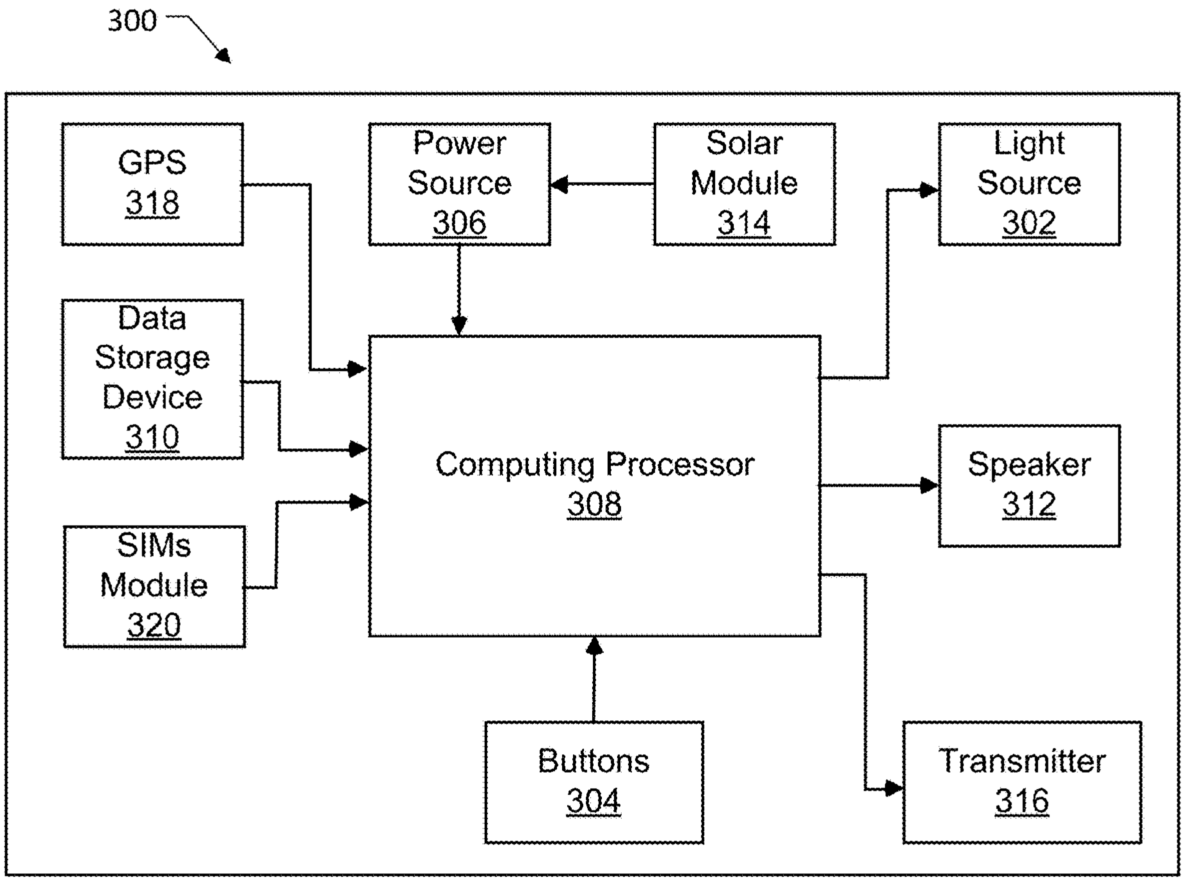
FIG. 3 illustrates a system diagram according to another embodiment of the present invention.

FIG. 3 illustrate another embodiment of the invention. In this embodiment, the system may further comprise a transmitter 316. In one embodiment, the transmitter 316 may operate as a tracking beacon, whereby the transmitter is configured to transmit and electronic signal that can be received by a user device, such as an emergency responder user device, as a tracking beacon that will lead the emergency responder to the location of the device. In some embodiments, the transmitter is configured to send out a tracking beacon that is recognized by a user device that has been preconfigured to receive the tracking signal. In other embodiments, the transmitter is a Bluetooth transmitter configured to transmit a beacon signal that can be detected by a user device via use of a tracking beacon application.

In some embodiments, the transmitter may be further configured to transmit data to a user device. For example, the computing processor 308 may retrieve location information indicating a current location of the system 300, such as an address, and transmit the location information via the transmitter 316 for receipt by a remote user device. In this embodiment, the computer processor 308 may retrieve other information, such as the owner of the system's name and contact information, and possibly health information, and transmit this information to a remote user device, such an emergency responder device.

As shown in FIG. 3, in some embodiments, the system 300 may include a global positioning system (GPS) 318 that determines a current location of the system 300. In this embodiment, the computing processor 308 retrieves location information from the GPS 318 and transmits the location via the transmitter 316.

In some examples, the transmitter is Wi-Fi compatible or Bluetooth compatible or otherwise wirelessly compatible to transmit the emergency wirelessly. In some embodiments, the transmitter could be configured for wired connection, such as via a wire or an ethernet connection.

In one embodiment, the system 300 may be enabled for cell phone communication. In this embodiment, the system 300 further includes a cellular subscriber identity module (SIM), which includes data and instructions for placement of a cellular call or short message service (SMS) text. In this embodiment, the system 300 may alert emergency responders by placing a call and/or sending a text message that identifies, at a minimum, the system 300. The system (via operation of the computing processor) may send location and user information or, alternatively, the emergency responder may have this information prestored and associated with the system 300 for lookup in case of an emergency.

With reference to FIG. 3, by way of example, a user may determine that an emergency has or is occurring. The user may depress the at least one button or switch 304. The computing processor 308 receives a signal that the button or switch has been activated. The computing processor may activate the light source 302 and the optional speaker 312. The computing processor may also gather location information and optional user contact information and transmit such information via the transmitter 316. The computing processor 308 may optionally or also transmit a beacon/tracking signal via the transmitter 316 for use in locating the system 300. If available in the system, the computing processor may optional place a cellular call or send a text message. As will be understood, the computing processor may control the light source to output various light patterns and colors. It may also control the speaker to output various sounds and alarms. Some of the light patterns/colors and optionally some of the sounds may indicate different types of emergencies, such as fire, burglary, accident, and the like.

Figure 4:
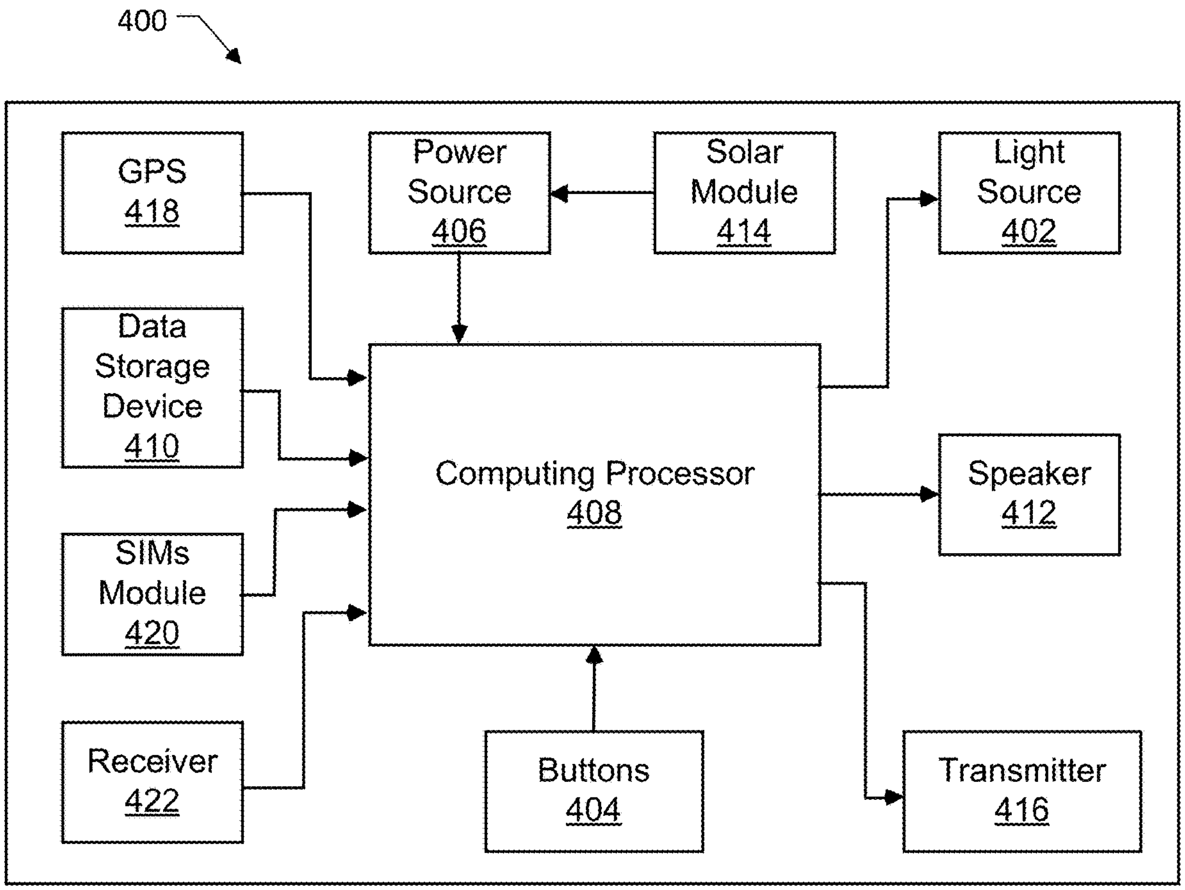
FIG. 4 illustrates a system diagram according to another embodiment of the present invention.

FIG. 4 illustrates operational diagram for another embodiment of the present invention. In this embodiment, the system 400 further includes a receiver 422. The receiver may as simple as an input connector for connecting the computer processor 408 to an external device. In other embodiments, the receiver may be a wireless receiver for receiving signals from a wireless device, such as a Bluetooth receiver, and in some embodiments the receiver may be a Wi-Fi receiver for connecting the system 400 to a network. In this embodiment, a user may communicate with the system 400 to download applications and information, perform system set up, and the like.

As an example, in one embodiment, the user may store a list of contacts in the system 400 via that data storage device 410. In this embodiment, when the buttons/switches are activated by the user in an emergency, in addition to the computing processor 408 sending emergency alerts via the light source 402, speaker 412, and transmitter 416 to emergency responders, the system 400 may also send alerts, such as phone calls and/or text messages to contacts identified by the user alerting such contacts of the emergency and optionally, the type of emergency.

As another example, the user may communicate an emergency to the system 400 via the receiver 422, such as from a cell phone, tablet, computer, or a home alarm system. When the user activates an emergency on one of these devices or one of the devices are triggered (such a home alarm system or a car alarm system), these devices will send the emergency alarm to the system 400 via the receiver 422 to thereby activate the system 400 to transmit the alarm, activate the lights and/or activate the speaker.

Figure 5A:
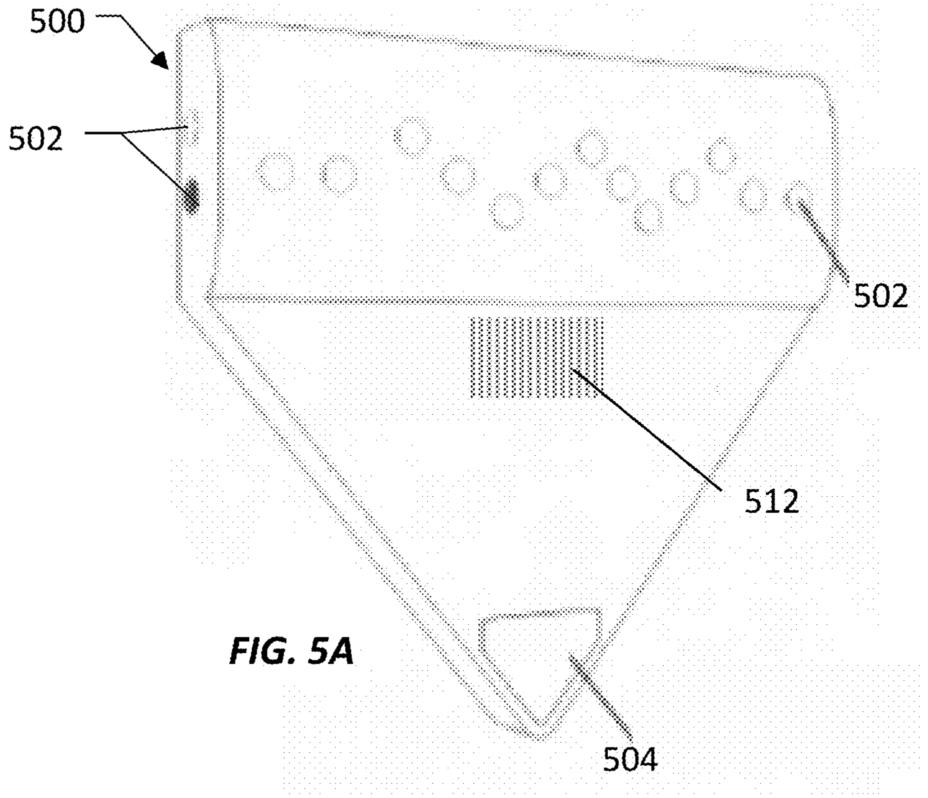
FIGS. 5A & 5B illustrate perspective views illustrating an alert system according to one embodiment of the present invention.
Figure 5B:
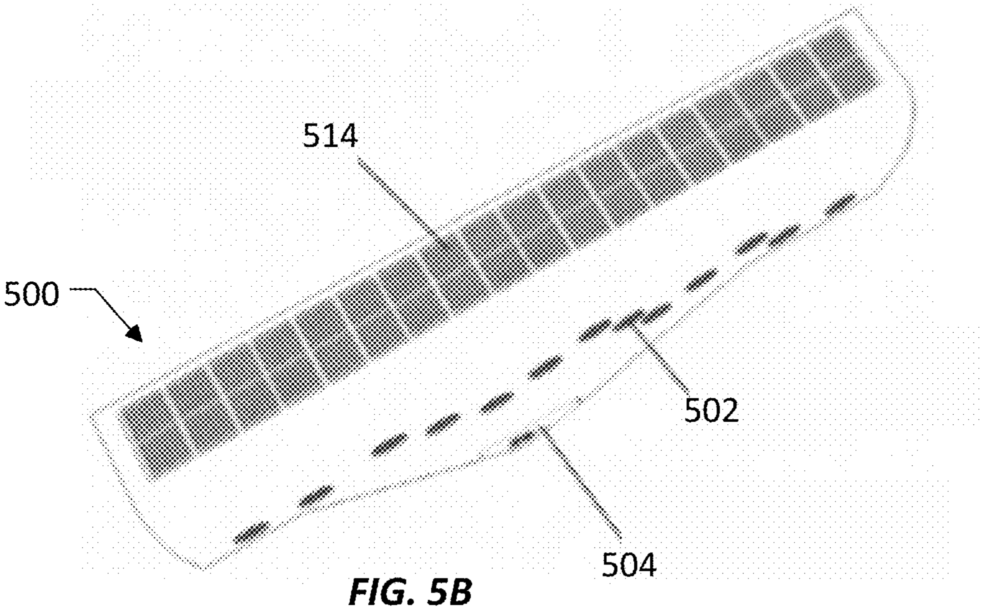

FIGS. 5A and 5B provide perspective illustrations of at least one embodiment of the present invention. As shown in this embodiment, the housing 500 comprises internally, one or more of the power source, computing processor, data storage device, solar module, receiver, SIMs module, GPS, etc. disclosed in the previous embodiments. As shown externally, the housing 500 includes multiple light sources 502 positioned on the front and sides of the housing. The light sources are arranged in a selected pattern so as to create a light pattern or different light patters when illuminated. The housing 500 also includes a button or button(s) 504, a speaker 512, and a solar cell 514.

Figure 6:
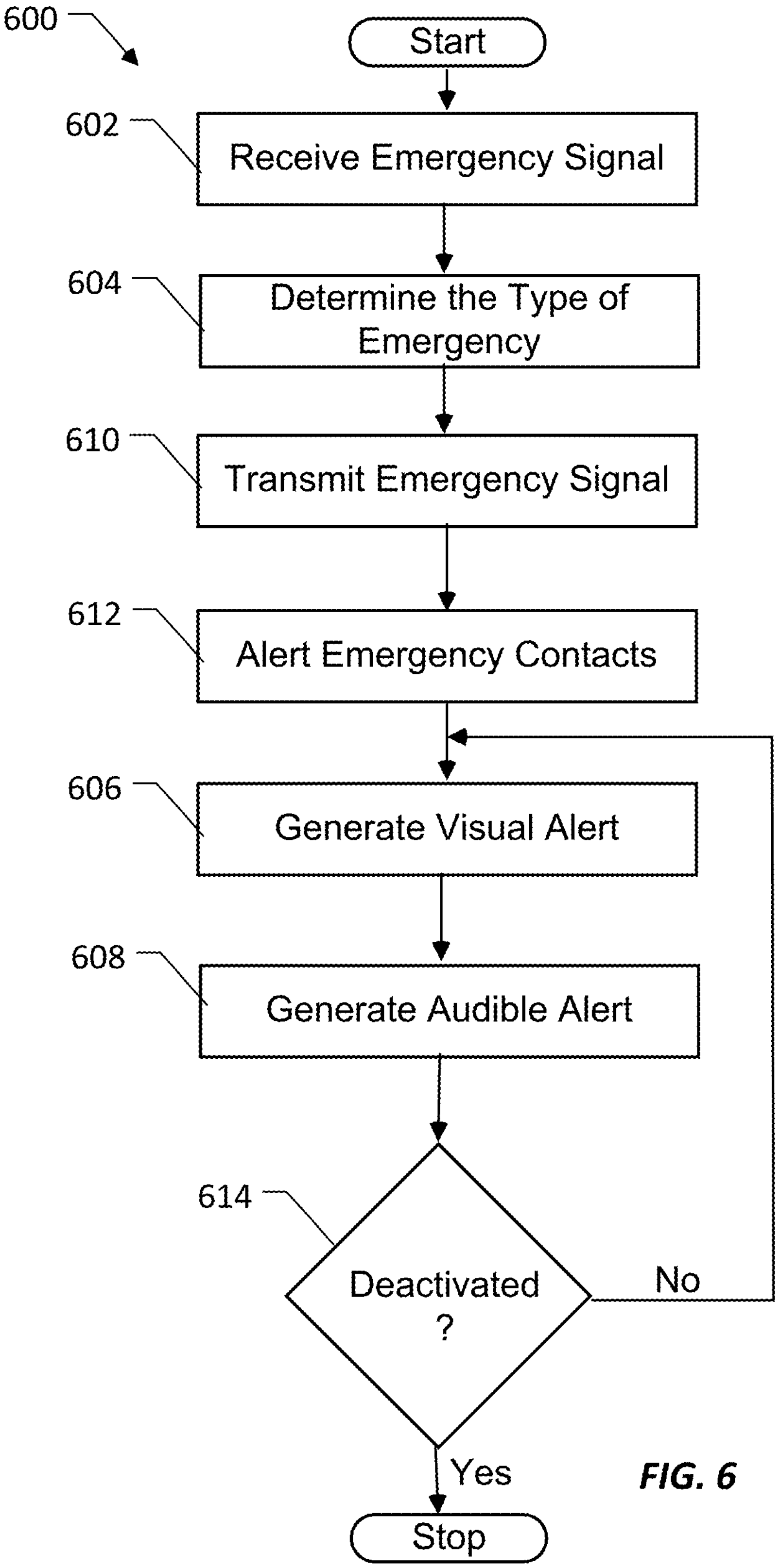
FIG. 6 illustrates an operational flow diagram of an embodiment performing the functions of an alert system according to one or more embodiments of the present invention.

FIG. 6 provides an example operational flow 600 for an example emergency event using the system 400 of FIG. 4. In this embodiment, when the user indicates an emergency, such as by depressing one or more of the buttons 404 or sends a signal from another device to the system 400 via the receiver 422, the computing processor 408 receives the signal (see 602), and, in some embodiments, may determine the type of emergency (see 604). The computing processor next sends a signal to the light source 402 to generate a visual alert (see 606). If available, the computing processor 408 may also send a signal to the speaker 412 to play an audible alert (see 608).

The computing processor 408 may also send an alert wirelessly via the transmitter 416. In some embodiments, the computing processor 408 may access the data storage device 410 and retrieve contact information for the emergency and transmit the information to emergency responders, such as by wired connection, Bluetooth, Wi-Fi, cellular, and the like (see 610). In some embodiments, the computing processor may also transmit a beacon/tracking signal via the transmitter.

In some embodiments, the computing processor may also retrieve stored contact information from the data storage device and alert such contacts of the emergency, such as by wired connection, Bluetooth, Wi-Fi, cellular, and the like (see 612). The system may continue to light the light source and the speaker, and any tracking beacons until the system is reset by pushing the button again or by some other deactivation (see 614).

As one skilled in the art will understand, the system of the current invention may be placed in any location where an emergency may occur. For example, it could be located on the side of a house, the front door of a house or apartment, at a business, on a vehicle, such as a car, truck, tractor, other farm equipment, construction equipment, and the like, at a location in a forest or woods or in an open field, at a sports facility or gym, and the like. In other words, the system may be placed at any location or on any item where emergency services may be needed.

Until now, the invention has been described in the context of a standalone device for placement at a location. The present invention may also be envisioned as an application or software on a general computing device, such as a mobile phone or tablet. In this embodiment, the application can control the various functions of the mobile device, such as the keypad, data storage, transmitter, receiver, battery, etc. to perform the functions described herein.

Figure 7:
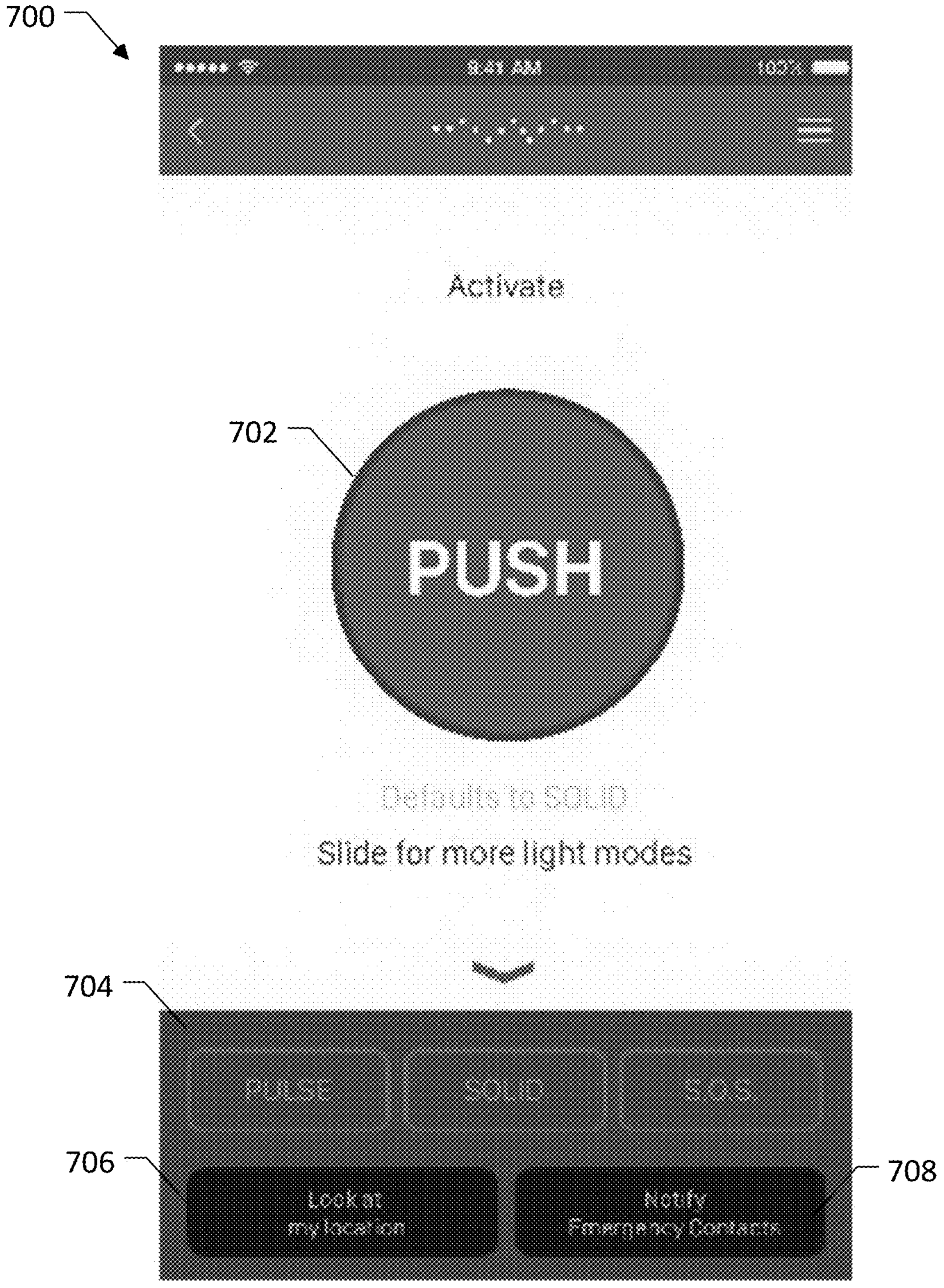
FIG. 7 illustrates a graphical interface for a mobile device application according to one or more embodiments of the present invention.

As an example, as shown in FIG. 7, in the context of a mobile phone, there may be a designated button 702 on a mobile application interface 700 for an emergency or the user may be able to speak to the device via speech to a virtual assistant to indicate the existence of an emergency. Based on receipt of an input, the computing processor of the mobile device, using computer instruction codes stored in the data storage device, may transmit the emergency via a screen or flashlight on the mobile device, transmit an audible signal via the speaker, alert emergency personnel via the cell service, as well as possibly alerting other emergency contacts stored in the mobile device.

With reference again to FIG. 7, the mobile phone may also communicate to the system of any of the embodiments of FIGS. 1-5 and generate alerts using the lights and speakers on the system housing to alert of the emergency, such that the mobile phone is used to control the system of any of the embodiments of FIGS. 1-5. For example, if the user is located in a house or building and has an emergency, the user can access the application interface 700 on a mobile phone and press the button 702.

The mobile phone may then communicate the alert to the system of any of embodiments of FIGS. 1-5 to create light and/or sound alarms on the system. The user may also select the type of alert to flash on the system via selection buttons 704. The user may choose to look at their current location by selecting a location button 706, which may show a map 900 (see FIG. 9). As will be discussed later, the user may select a contact button 708 to have the system alert the user's stored emergency contacts.

Figure 8:
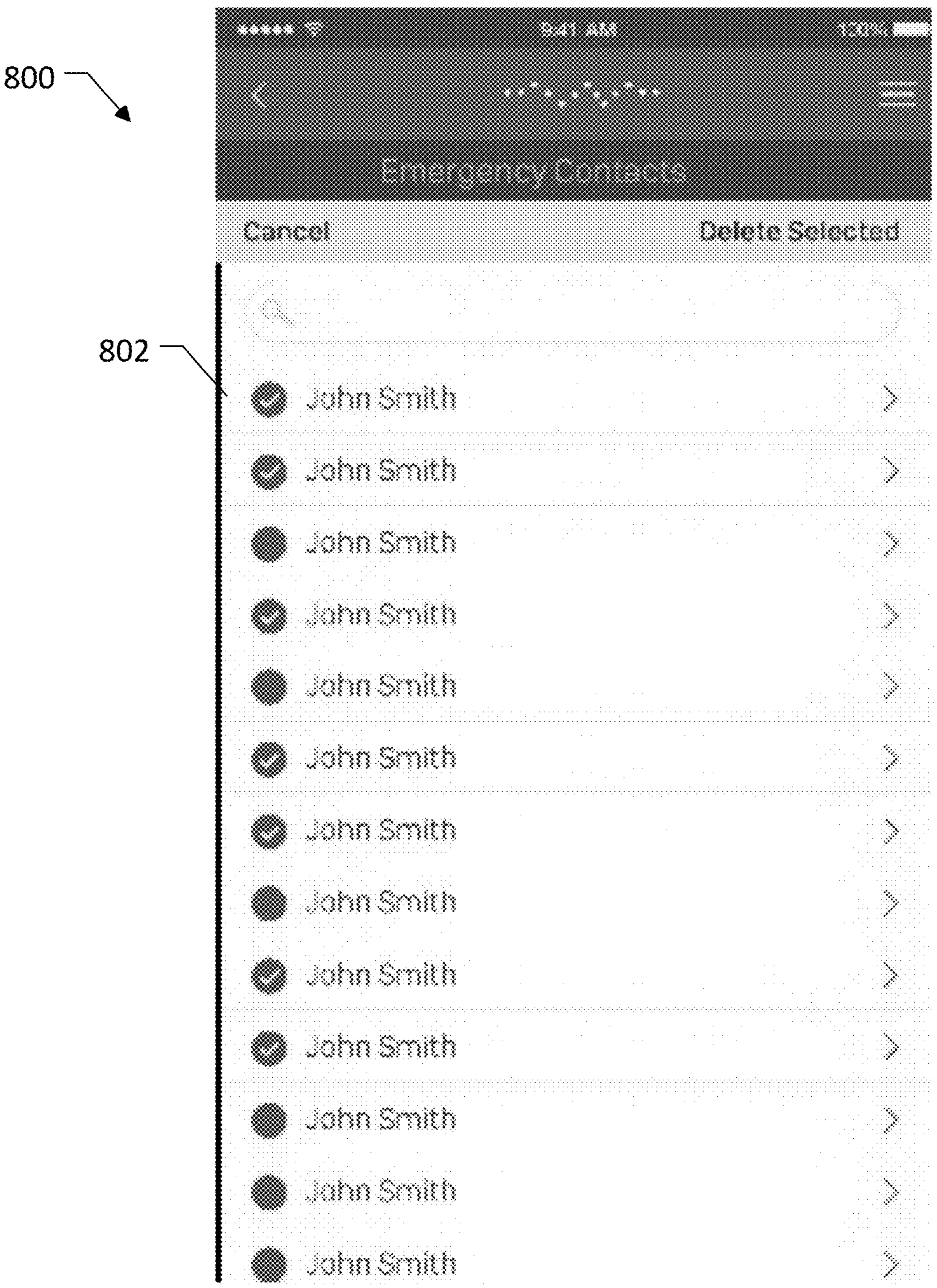
FIG. 8 illustrates a graphical interface for a mobile device application according to one or more embodiments of the present invention.
Figure 9:
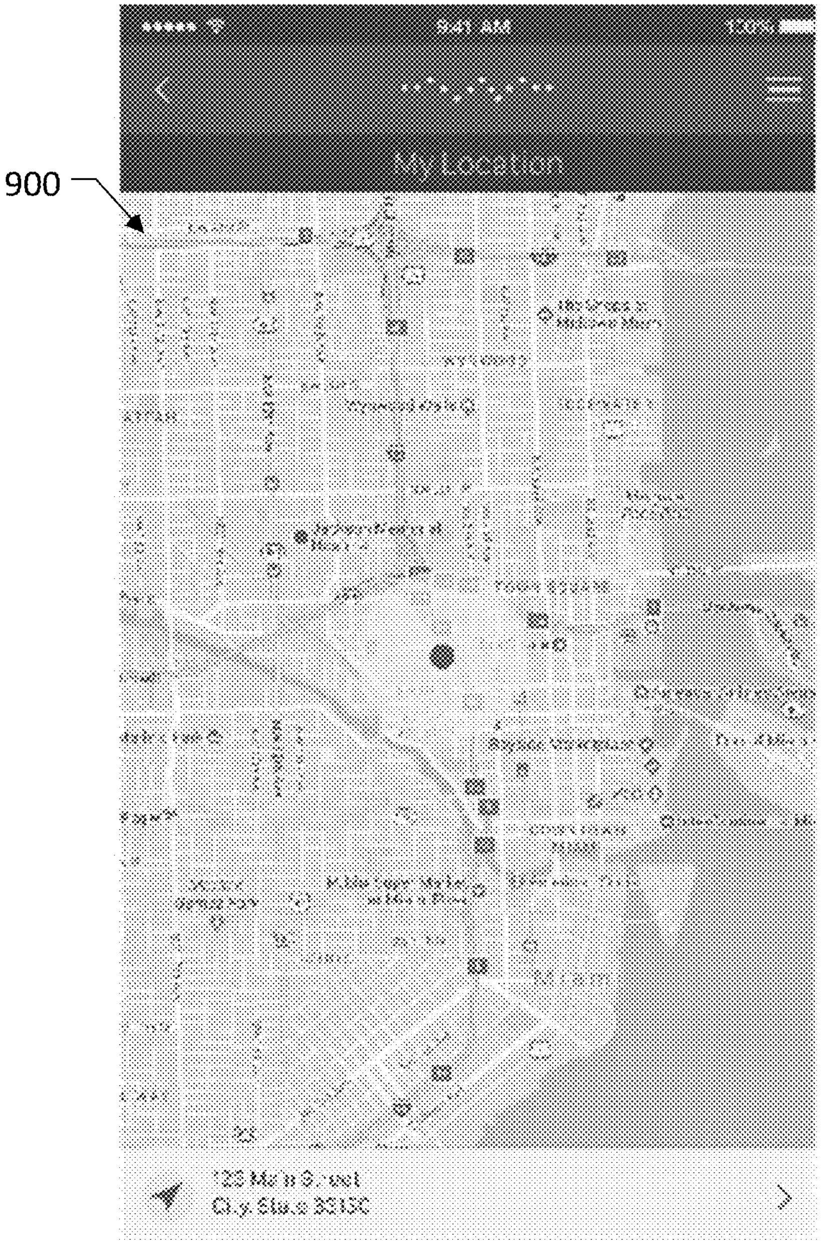
FIG. 9 illustrates a graphical interface for a mobile device application according to one or more embodiments of the present invention.

Further, the mobile application may also send location and emergency information to first responders. It may also send emergency information to the list of contacts (see FIG. 8 depicting a graphical interface 800 and list of contacts 802) stored in the application and/or on the mobile phone that are listed as emergency contacts. This information may provide the type of emergency and the user's location, such as for example, a map 900 as shown in FIG. 9.

Figure 10:
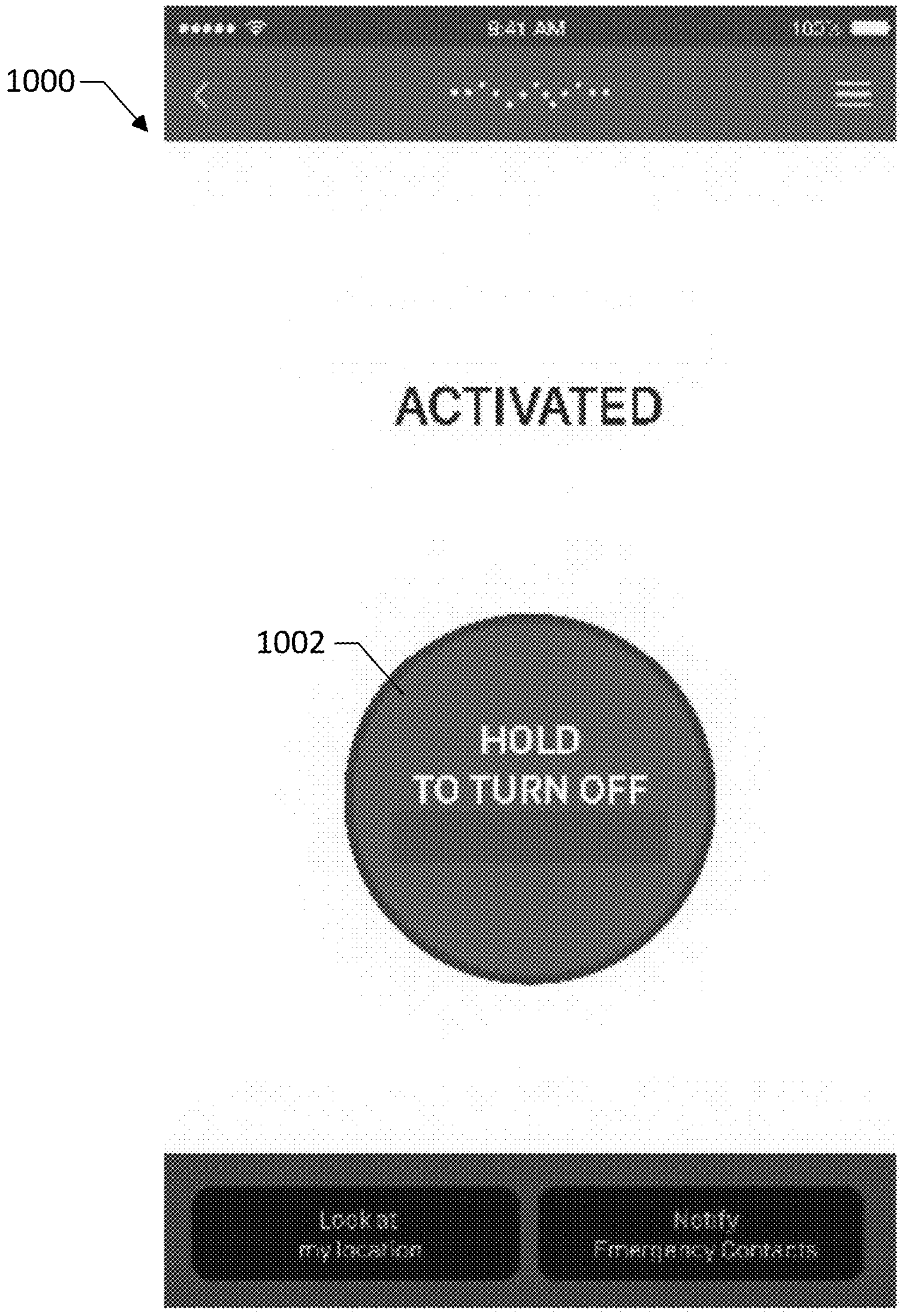
FIG. 10 illustrates a graphical interface for a mobile device application according to one or more embodiments of the present invention.

Further, as shown in FIG. 10, the user, via the interface 1000, can deactivate the emergency, which may deactivate the system of any of embodiments of FIGS. 1-5, it may alert first responders that the emergency has passed, and it may also alert the emergency contacts also.

As will be understood, the mobile application may provide other functions, such as allowing the user to video chat, text, etc. with first responders and emergency contacts during the emergency.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

The invention claimed is:

1. A system for generating alerts communicated to emergency responders indicating a location of an incident, said system comprising:

a housing;

a computing processor located in said housing;

a switch located in said housing configured to be accessible to a user;

a cellular subscriber identity module (SIM) connected to said computing processor;

a transmitter in said housing electrically connected to said computing processor, wherein when said switch is actuated by a user indicating an incident, said processor is configured to use said SIM module and said transmitter to transmit an emergency signal;

one or more light sources located remotely from the housing and communication with said processor, wherein when said switch is actuated by a user indicating an incident, said computing processor is configured to provide power to said one or more light sources; and data storage device connected to said computing processor, said data storage device comprising computer instruction code representing different light patterns for operation of said one or more light sources, and wherein said computing processor is capable of operation of said instruction code to activate the one or more light sources in different light patterns to indicate an emergency.

2. A system according to claim 1 further comprising a power source connected at least to said computing processor.

3. A system according to claim 2, wherein said power source is rechargeable and wherein said system further comprises a solar cell located in said housing and connected to said power source to thereby recharge said power source.

4. A system according to claim 1 further comprising a speaker in said housing electrically connected to said computing processor, wherein said computing processor is configured to control said speaker to output an audible sound when the switch is activated by the user.

5. A system according to claim 1 further comprising a plurality of switches, where each switch corresponds to a type of emergency, wherein said computing processor is configured to control said transmitter to transmit an emergency signal that is specific to a particular switch of said plurality of switches that is activated by the user.

6. A system according to claim 1 further comprising a global positioning system connected to said computing processor, wherein said computing processor is capable of receiving location data from said global positioning system and controlling said transmitter to transmit the location data.

7. A system according to claim 1 further comprising a data storage device connected to said computing processor, said data storage device comprising location data, wherein said computing processor is capable of receiving location data from said data storage device and controlling said transmitter to transmit the location data.

8. A system according to claim 1 further comprising a data storage device connected to said computing processor, said data storage device comprising computer instruction code operated by said computing processor to use said SIM module and said transmitter to transmit the emergency signal.

9. A system according to claim 1 further comprising a receiver for receiving signals from a remote device.

10. A system according to claim 9, wherein said receiver is one of at least a Bluetooth receiver and/or a Wi-Fi receiver.

11. A system according to claim 9, wherein said computing processor is configured to receive data from said receiver and control said SIM module and said transmitter based on the received data.

12. A system according to claim 1 further comprising: a data storage device connected to said computing processor, wherein said data storage device comprises location data and cellular information for one or more users, wherein said computing processor is capable of receiving location data from said data storage device and controlling said transmitter to transmit the location data using the SIM module to the one or more contacts stored in the data storage device.

13. A system according to claim 1, wherein said transmitter is configured to operate as a tracking beacon, whereby the transmitter transmits a periodic or continuous electronic signal that can be received by a user device to allow a user of the user device to locate the system.

14. A system according to claim 1, wherein said transmitter is configured to transmit data to a user device, wherein such data comprises one or more of: location information indicating a current location of the system, owner and contact information associate with an owner or user of the system, and/or health information associated with an owner or user of the system.

15. A system according to claim 1 further comprising a receiver, wherein said receiver is capable of receiving commands from a remote device and the processor is configured for activating the light source and using said SIM module and said transmitter to transmit an emergency signal based on commands received from the remote device.

16. A system according to claim 15, where in said remote device is a cell phone comprising software configured to communicate with the system and allow user to transmit commands to the system to thereby cause the processor to active the light source and use said SIM module and said transmitter to transmit an emergency signal based on commands received from the remote device.

* * * * *